May 5, 1942.                R. THOMAS                 2,281,607
                      MULTIPLE PHOTOGRAPHY
           Filed July 25, 1939              8 Sheets—Sheet 1

RICHARD THOMAS,
INVENTOR.

BY Lyon & Lyon
ATTORNEYS.

May 5, 1942.  R. THOMAS  2,281,607
MULTIPLE PHOTOGRAPHY
Filed July 25, 1939  8 Sheets-Sheet 2
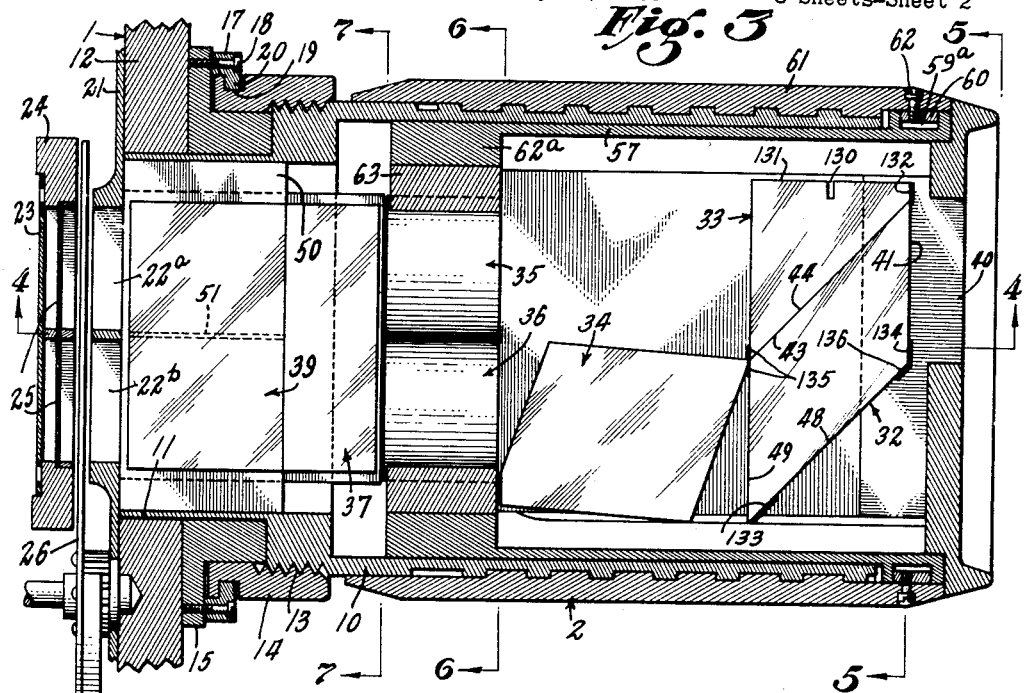
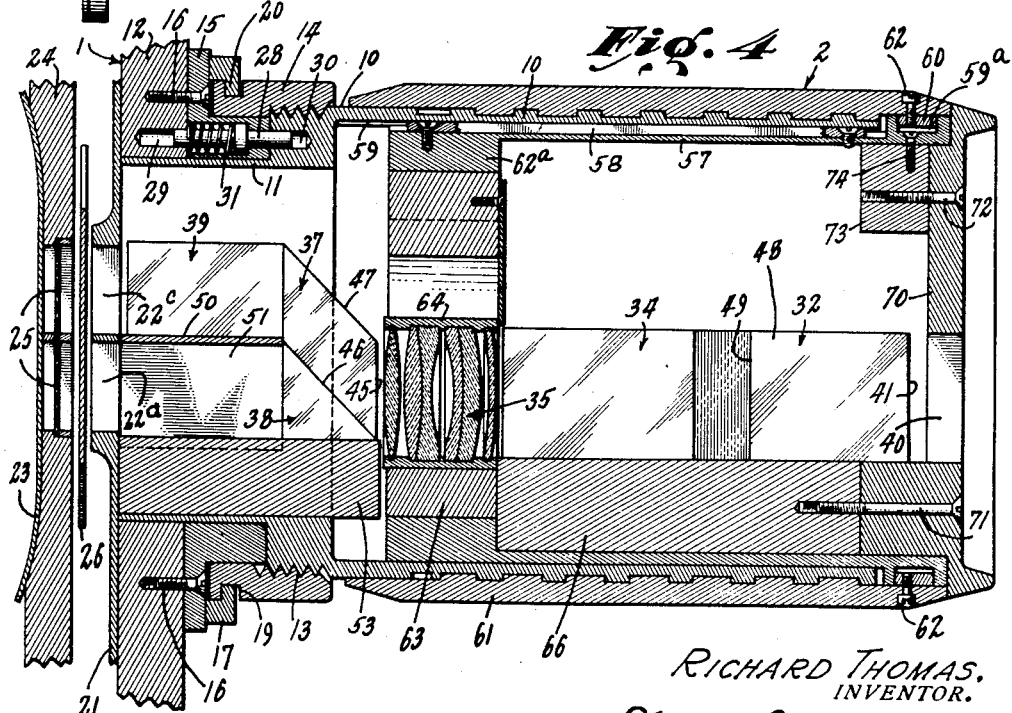
RICHARD THOMAS,
INVENTOR.
BY Lyon & Lyon
ATTORNEYS.

May 5, 1942.  R. THOMAS  2,281,607
MULTIPLE PHOTOGRAPHY
Filed July 25, 1939  8 Sheets-Sheet 3

RICHARD THOMAS,
INVENTOR.
BY Lyon & Lyon
ATTORNEYS.

May 5, 1942.     R. THOMAS     2,281,607
MULTIPLE PHOTOGRAPHY
Filed July 25, 1939     8 Sheets-Sheet 4
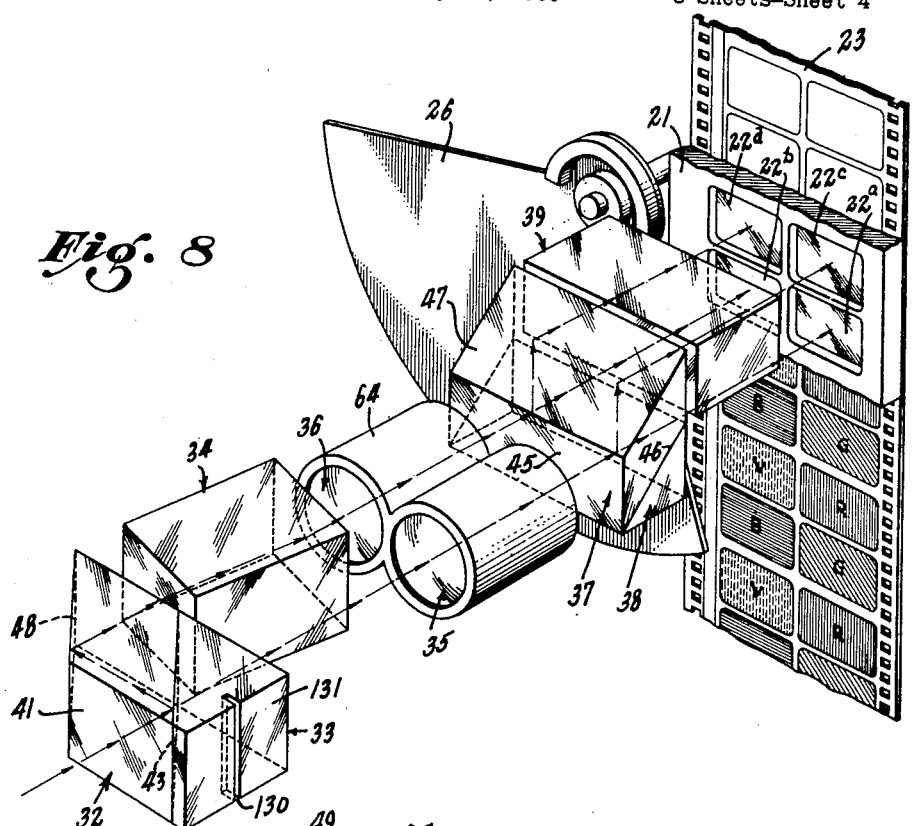
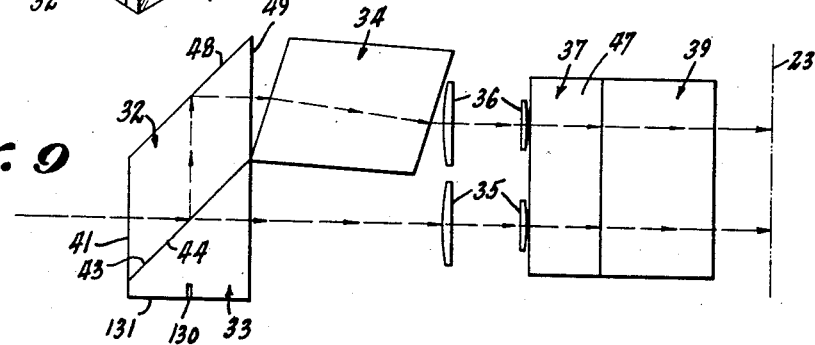
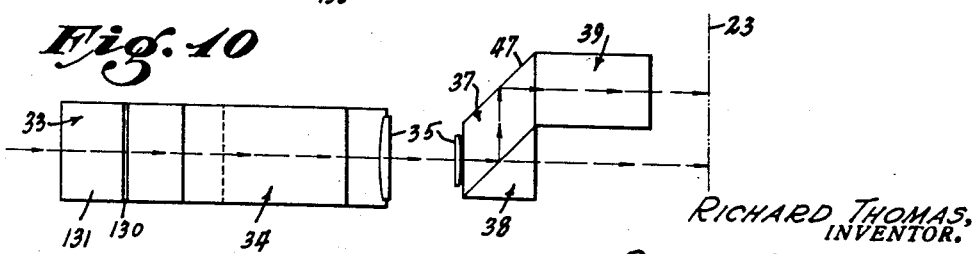
RICHARD THOMAS, INVENTOR.
BY Lyon & Lyon
ATTORNEYS.

May 5, 1942.                R. THOMAS                2,281,607
                        MULTIPLE PHOTOGRAPHY
                    Filed July 25, 1939          8 Sheets-Sheet 5
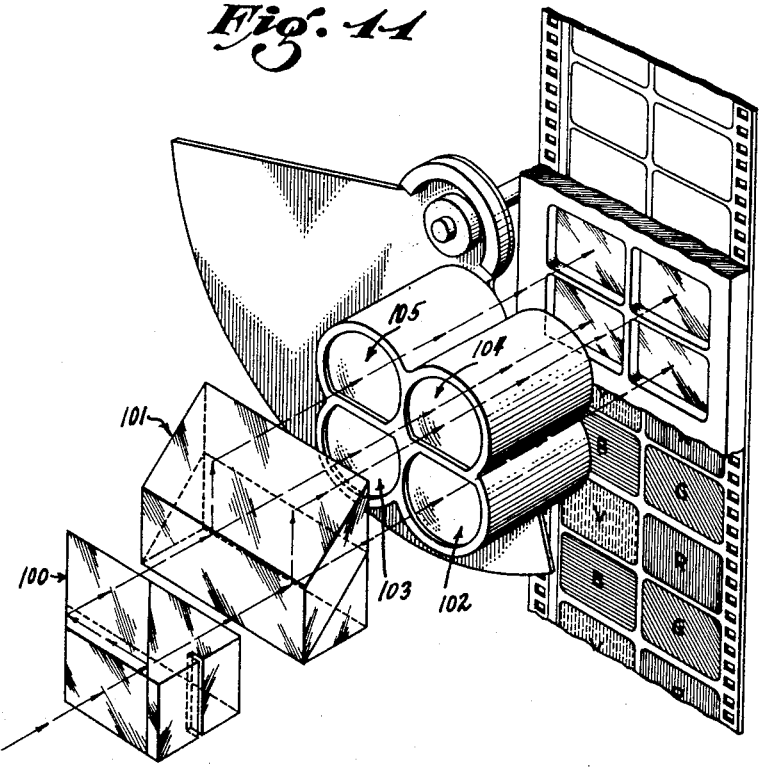
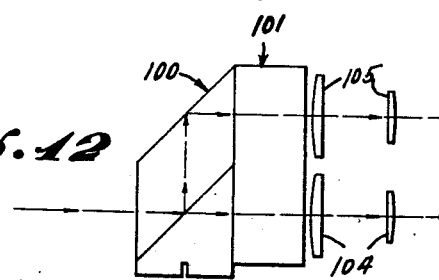
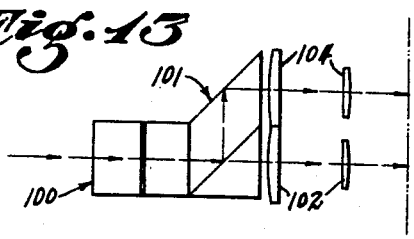
RICHARD THOMAS,
INVENTOR.
BY Lyon & Lyon
ATTORNEYS.

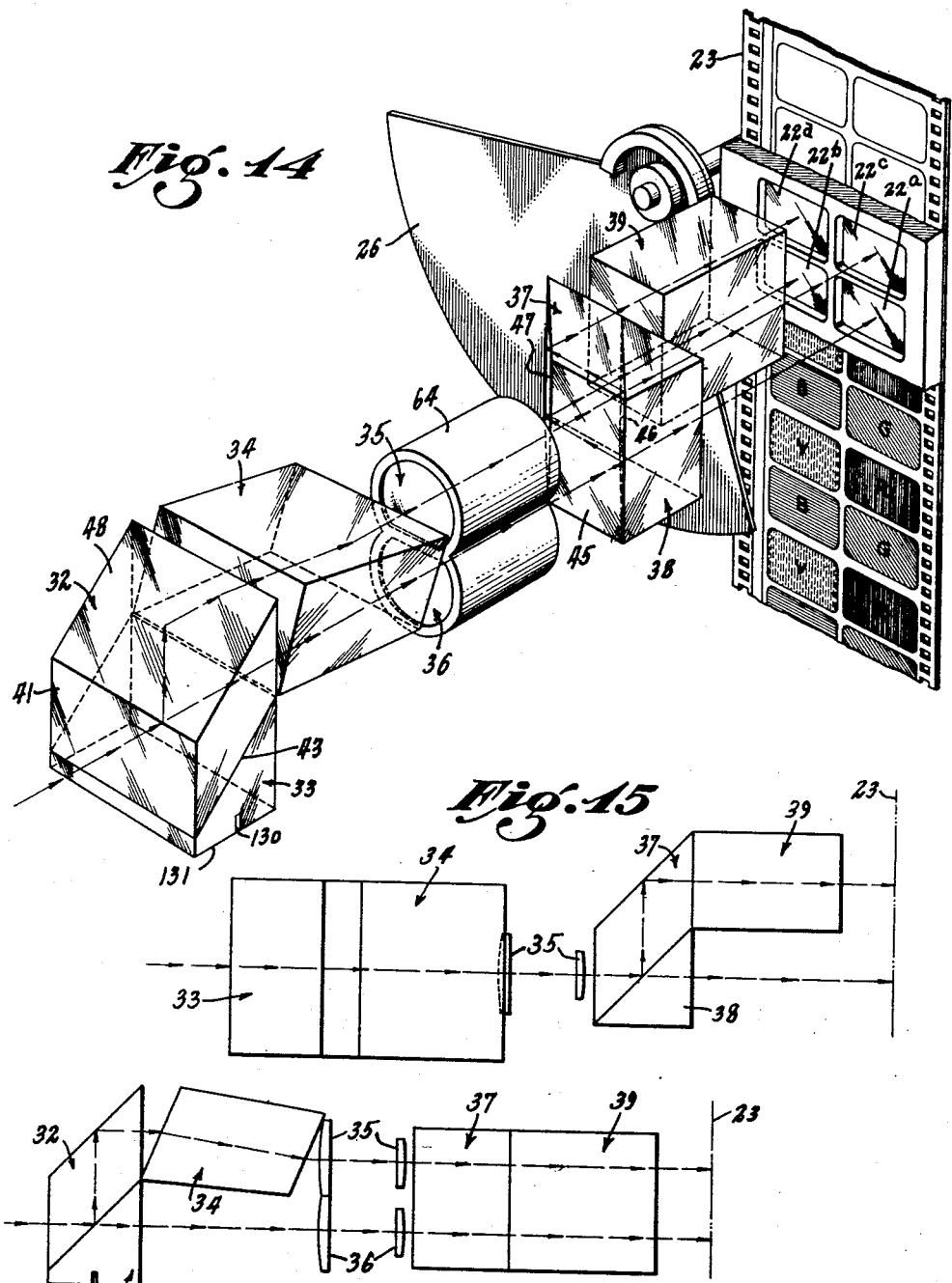

May 5, 1942.                R. THOMAS                2,281,607
                        MULTIPLE PHOTOGRAPHY
                        Filed July 25, 1939            8 Sheets-Sheet 7
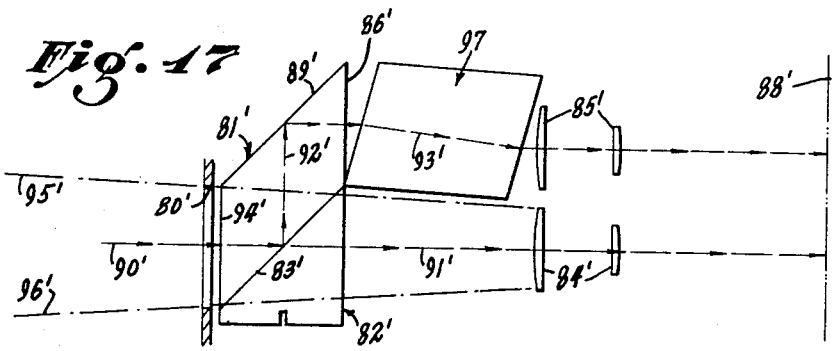
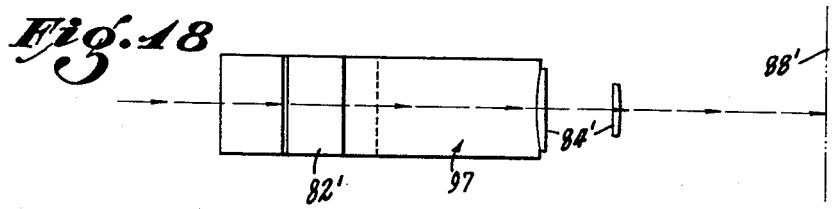
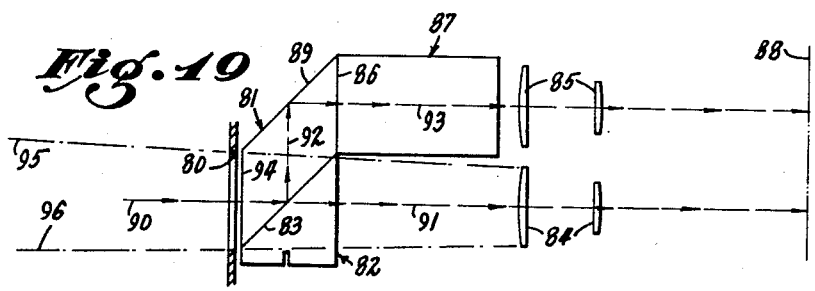
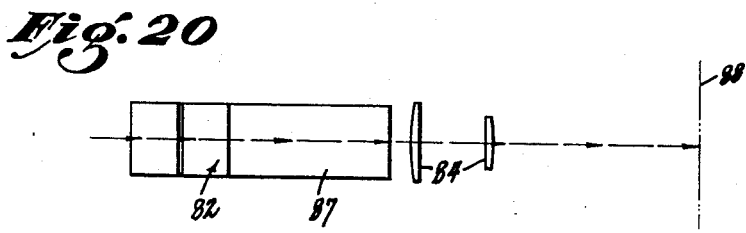
RICHARD THOMAS,
INVENTOR.
BY Lyon & Lyon
ATTORNEYS.

May 5, 1942.    R. THOMAS    2,281,607
MULTIPLE PHOTOGRAPHY
Filed July 25, 1939    8 Sheets-Sheet 8

RICHARD THOMAS.
INVENTOR;
BY Lyon & Lyon
ATTORNEYS.

Patented May 5, 1942

2,281,607

UNITED STATES PATENT OFFICE 2,281,607

MULTIPLE PHOTOGRAPHY

Richard Thomas, Los Angeles, Calif., assignor to Thomascolor Corporation, a corporation of Nevada Application July 25, 1939, Serial No. 286,370

14 Claims. (Cl. 88—1)

This invention relates to optical systems for simultaneously producing a plurality of photographic images of a single scene, or vice versa, combining a plurality of images into a single composite image. It is particularly useful in color photography for simultaneously exposing a plurality of color separation images side by side on the same film.

Probably the most difficult problems in multiple photography have been the elimination of parallax and the obtainment of sufficient light for exposure of the sensitive film, with proper suppression of extraneous light. Parallax results whenever the different pictures are taken from different points of view, as by two complete, independent lens systems mounted side by side, and is highly objectionable because it results in different parts of the scene at different distances from the camera occupying different relative positions in the two pictures so that they cannot be superimposed in exact registration throughout, as is necessary with color separation negatives if color fringes are to be eliminated.

An object of the present invention is to provide practicable optical systems for making simultaneous multiple exposures with little or no parallax and with relatively strong illumination.

Other more specific objects and advantages of the invention will become apparent from the detailed description to follow.

In its simplest form my optical system may be employed to project identical images of a single scene on two frames of a single film. Briefly, such a simple system comprises a pair of objective lenses symmetrically positioned in front of the respective frames, with a partial reflection plane positioned in front of one of the lenses and transmitting part of the light rays directly to the one lens but reflecting the remainder of the rays into a different laterally extending path; I then provide additional total reflection means for directing the laterally reflected rays into the other lens. I preferably position an optical block in the path of the rays going to the second lens to compensate for the greater distance traveled by the reflected rays between the partial reflection plane and the second lens. My system as described is completely free from spherical aberration and distortion by virtue of the fact that the optical unit is placed in front of the lens where an image has not yet been formed, and the rays are practically parallel. My system completely eliminates parallax because all the light going to both frames enters the optical system in the same path and traverses paths of optically equal lengths within the optical system.

In the simplest form of the system as described, the axes of the objectives and the centers of the partial and total reflectors, respectively, are spaced apart the distance between the centers of the image frames, and hence the effective areas of the reflectors and lenses are limited by the size of the frames. In commercial photography, this does not ordinarily impose a serious limitation on the lens size, but it may impose a serious limitation on the area of the partial reflection plane because the latter should have a larger area than the lenses, since it is in front of the lenses and the useful light entering the lenses is converging from the field of view, I provide for larger reflectors having a lateral spacing between centers greater than the spacing between frame centers by substituting a bi-plate for the optical block in the path of reflected light rays, this bi-plate being so disposed as to shift the reflected light rays laterally into alignment with the second lens.

A useful variation of the simple system described for two-image work is that in which a single lens is employed, into which the light enters directly from the objective scene, with partial and total reflection planes as described positioned back of the single lens for separating the light rays into two bundles going to the two respective frames after all the light rays have been refracted by the single objective lens.

By repeating the process described, a single bundle of light rays may be initially separated into two identical bundles and then one or both of these bundles further separated into two bundles of light, thereby adapting the system for three or four frame work, instead of two frame work. A convenient way of practicing the invention to obtain four identical images close together is to employ one partial reflection system in front of two objective lenses with another partial reflection system of the type described positioned back of the two lenses.

The invention will now be fully explained by describing certain specific embodiments thereof, with reference to the drawings.

In the drawings:

Fig. 3 is a horizontal sectional view through the main lens housing of the camera in Fig. 1, taken approximately in the plane 3—3 of Fig. 1;

Fig. 4 is a vertical sectional view taken in the plane 4—4 of Fig. 3;

Fig. 8 is a perspective view showing the elements of the optical system disclosed in detail in Figs. 3 to 7, inclusive, with the supporting and enclosing structure removed;

Figs. 9 and 10 are schematic plan and side elevation views, respectively, of the system shown in Fig. 8;

Fig. 11 is a perspective view, similar to Fig. 8, but showing a modified system employing four lenses, instead of two, with the entire optical system for splitting the incoming light into four beams, positioned in front of the lenses;

Figs. 12 and 13 are schematic plan and side elevation views, respectively, of the system shown in Fig. 11;

Fig. 14 is a perspective view, similar to that of Fig. 8, but showing a modified construction in which the two lenses are positioned one above the other instead of in the same horizontal plane;

Figs. 15 and 16 are schematic plan and side elevational views, respectively, of the system shown in Fig. 14;

Figs. 17 and 18 are schematic plan and side elevation views, respectively, of an optical system in accordance with the invention, for two picture work;

Figs. 19 and 20 are schematic plan and side elevational views, respectively, of a simpler variation of the system shown in Fig. 17;

Figure 1:
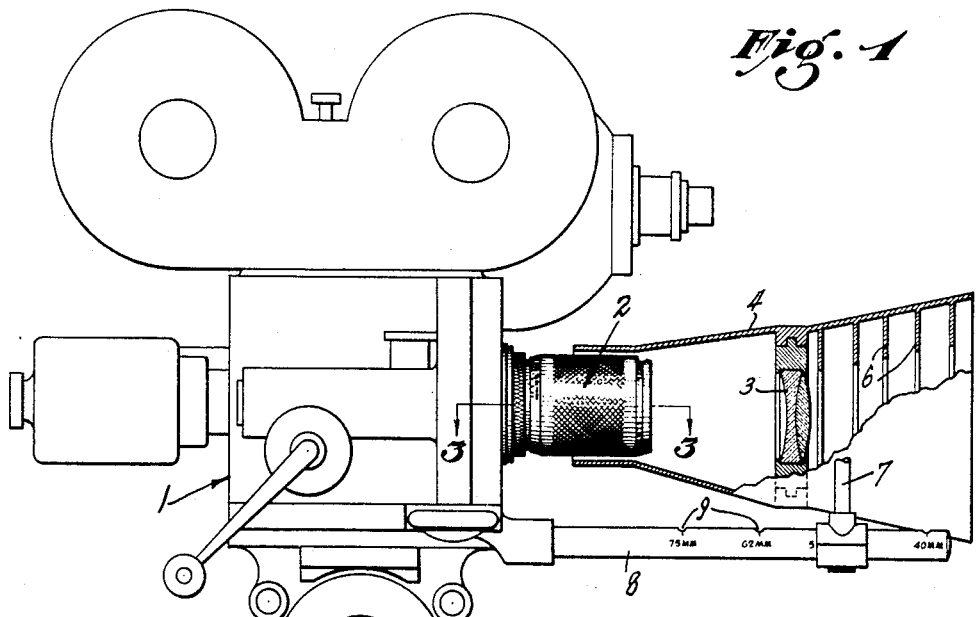
Fig. 1 is a side elevation view of a motion picture camera equipped with an optical system in accordance with my invention for simultaneously projecting onto a film four images of a single objective scene, a portion of the optical system being shown in section.
Figure 2:
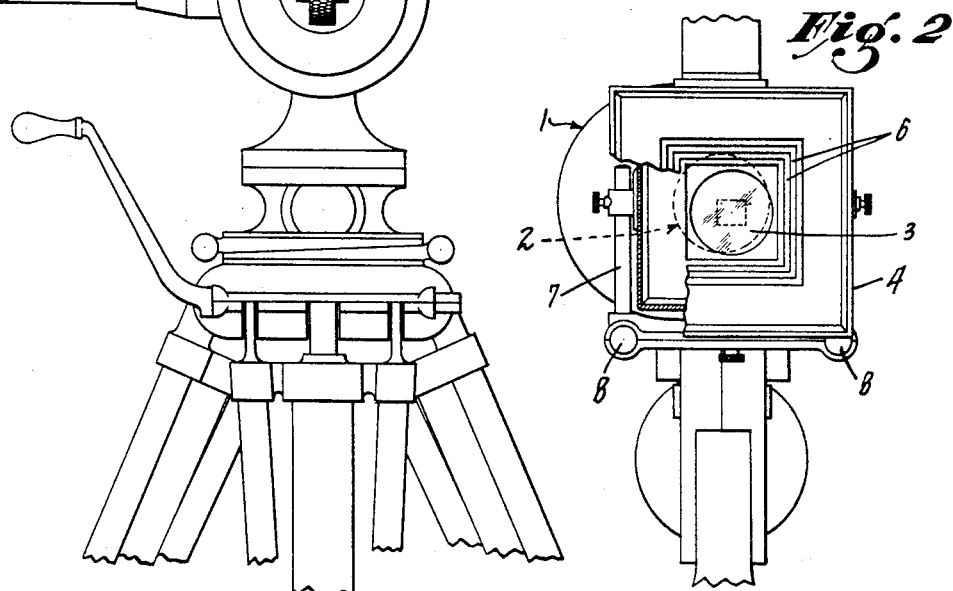
Fig. 2 is a front elevation view of the central portion of the camera shown in said elevation in Fig. 1.

Referring to Fig. 1 there is shown a motion picture camera adapted for simultaneously exposing four frames on a single film by means of an optical system in accordance with the present invention. The camera housing proper is designated by the reference numeral 1 and the general assembly, including the optical system proper, is contained in a mount generally identified by the reference numeral 2. The present invention does not relate to the mechanical details of the camera and therefore no detailed description of the camera structure need be given, it being understood by those skilled in the art that many existing and known mechanisms for moving the film and actuating the shutter may be employed.

The optical system contained within the mount 2 may be designed to provide a predetermined field of view dependent upon the characteristic of the objective lens included therein, which lens will be described later. In order to vary the field of view of the camera without changing the objective lens, I preferably provide for the attachment of an auxiliary lens to be positioned in front of the objective lens at varying distances to give a plurality of effective field angles. As shown in Fig. 1, this auxiliary lens comprises a divergent lens 3 mounted in hood 4, the rear end of which surrounds the mount 2 containing the optical system, in telescopic relation therewith. The hood 4 is preferably provided with a plurality of apertured diaphragms 6 in front of the lens 3 to eliminate to as great an extent as possible the entry of extraneous light into the optical system. The hood 4 is supported on the camera by means of a column 7 slidably mounted on the rod 8 extending forwardly from the camera housing 1. The rod 8 has calibrating notches 9 for accurately fixing the lens 3 at any one of a plurality of distances in front of the mount 2. The mode of adjustment will be described in detail later. As previously indicated, the optical system within the mount 2 is complete in itself for a predetermined field of view, and may be employed without the auxiliary lens, the entire auxiliary lens assembly being then removed from the camera.

The construction and operation of the optical system contained within the barrel or mount 2 will therefore first be described without reference to the auxiliary lens.

Referring to Figs. 3 to 7, inclusive the mount 2 comprises a tubular housing 10 having a thin rear end portion 11 which projects through an aperture provided therefor in the front wall 12 of the camera housing 1. The entire assembly of optical elements is contained within the tubular housing 10 and may be removed from the camera with the housing. This housing 10 is attached to the camera by means of external threads 13 thereon which engage internal threads on a cylindrical mount ring 14 which surrounds a flanged ring 15 secured to the camera wall 12 as by screws 16 (Fig. 4). The mount ring 14 is permanently rotatably secured to the ring 15 by a retainer ring 17 which is attached to ring 16 by screws 18 (Fig. 3). Thus the mount ring 14 has an annular groove 19 in its exterior surface, which ring is engaged by an inwardly projecting annular flange 20 on the retainer ring 17. The tubular housing 10 is attached to the camera, or removed therefrom, by rotating the mount ring 14 in one direction or the other.

Secured to the rear surface of the camera wall 12 is a framing member 21, defining four rectangular apertures or frames 22, which define the shapes and dimensions of the images formed on a sensitive film 23 which is adapted to be moved vertically back of an aperture plate 24 which is slightly spaced rearwardly from the aperture plate 21.

My system of multiple photography is primarily useful in making a plurality of color separation negatives of the same objective field and to this end the four apertures in the aperture plate 24 are provided with different color filters 25. A shutter 26 may be positioned between the frame member 21 and the aperture plate 24 for controlling the passage of light through the frames 22 and the color filters 25 to the film 23.

The optical system contained within the tubular housing 10 is adapted to project four images through the four respective frame apertures 22, which may be separately identified for convenience as 22a, 22b, 22c and 22d, the two lower apertures being 22a and 22b, respectively, and the two upper apertures being 22c and 22d, respectively, with aperture 22c positioned above aperture 22a, and aperture 22d positioned above aperture 22b. It is necessary, as will appear later, that the optical system within the tubular member 10 be accurately oriented with respect to the frames 22, and to this end an aligning dowel 28, (Fig. 4), is mounted in the flanged ring 15, being slidable fore and aft with its rear end projecting into a hole 29 in the camera wall 12, and its forward end projecting into a hole 30 in the tubular member 14. The dowel 28 is resiliently urged forwardly by a spring 31 surrounding it within the space provided therefor within the ring 15, so that when mounting the tubular member 10 on the camera, it may be rotated until it is automatically stopped and retained in proper position by entry of the forward end of the dowel 28 into the hole 30.

The optical system within the mount 2 comprises as its essential elements a front optical rhomb 32, a front optical prism 33, a bi-plate 34, a pair of objective lenses 35 and 36, respectively, a rear rhomb 37, a rear prism 38, and an optical block 39. The rear rhomb 37, prism 38 and optical block 39 are fixedly mounted within the tubular housing 10, but the remaining optical elements listed are movable as a unit fore and aft within the tubular member 10 for focusing. The term "rhomb" as used hereinafter, is intended to denote an optical element or block, that is rhomboidal in section in the plane of light reflection as hereinafter set forth, and the term "bi-plate" is intended to denote an optical element or block that is trapezoidal in section in the plane of light refraction, i. e., having two opposite, parallel, light refractive surfaces that are disposed more or less diagonally with respect to the lengthwise extent of the block, and whether or not the other two faces of the block are parallel.

These optical elements function as follows:

Referring to Fig. 3, a bundle of light rays from the objective field to be photographed enters through an aperture 40 in the front end of housing 2 which is juxtaposed to the front face 41 of the front rhomb 32 and is intercepted by lateral face 43 of the rhomb, which is juxtaposed to the front face 41 at an angle thereto. This face 43 is partially silvered and the space between this silvered surface and the juxtaposed face 44 of the prism 33 is filled with balsam or other material having substantially the same refraction index as glass, so that the partially silvered surface 43 constitutes a partial reflection plane. Therefore part of the bundle of light enter the aperture 40 passes directly rearwardly through the rhomb 32 and the prism 33, to the lens 35, which focuses the light in the plane of the film 23.

Referring, now, to Fig. 4, the light after passing through and being refracted by the lens 35 enters the rhomb 37 through the front face 45 thereof, and is intercepted by the diagonal lateral face 46 of this rhomb, which is partially silvered like the surface 44 of rhomb 32 and is juxtaposed to the prism 38. Part of the light reaching the rear rhomb through the lens 35 continues past the partial reflection surface and is focused on the film 23 through the aperture 22a in the frame plate 21.

That portion of the light entering the rhomb 37 which is reflected from the partially silvered surface 46 thereof, is deflected laterally against the opposite lateral face 47 of rhomb 37 and is totally reflected by internal reflections from this surface through the optical block 39 and the aperture 22c in the frame plate 21 onto the film 23. The structure so far described, therefore, functions to focus two images of the objective field onto two vertically disposed frames of the film juxtaposed to the apertures 22a and 22c, respectively. The other two images on the film are formed from the light partially reflected from the partially silvered surface 43 of rhomb 32, this light being deflected laterally against the opposite face 48 of the rhomb and totally reflected therefrom through the rear face 49 of the rhomb and thence through the bi-plate 34 into the lens 36, the bi-plate 34 serving to deflect the rays into alignment with the lens 36. Thus light passes through and is focused by the lens 36 in the plane of the film 23 exactly the same as the light passing through lens 35 is focused. Furthermore, the light passing through lens 36 is separated into two portions by the partially silvered surface 46 of rhomb 37 and transmitted through the two frames 22b and 22d onto the film 23 exactly as described in connection with the light passing through the lens 35. In Fig. 8 the paths of the central rays of light going to all four frames 22a, 22b, 22c and 22d are indicated by the arrowed lines, and may be readily traced.

The optical block 39 refracts the light rays reflected from the partially silvered surface 46 in such a way as to compensate for the increased distance traveled by these reflected rays as compared to the distance traveled by the rays transmitted through the partially silvered surface 46 to the frames 22a and 22b. Obviously the length of the light paths between the lenses and the upper frames 22c and 22d are greater than the paths to the lower frames 22a and 22b, so that images could not be thereby focused in both the upper and the lower frames if the different distances were not compensated for by the optical block 39.

The bi-plate 34 (Fig. 8) in addition to its function previously mentioned of bringing the light rays reflected from the surface 48 of the rhomb 32 into alignment with the lens 36, i. e., so that the lenses 35 and 36 may be closely juxtaposed, also functions to compensate for the greater length of the light path from the partial reflecting surface 43 to the lens 36, as compared to the length of the path from surface 43 to the lens 35.

Of course the necessity of employing the bi-plate 34 instead of a simple optical block, arises from the fact that the lateral spacing between the centers of surfaces 43 and 48 of rhomb 32 is greater than the lateral spacing between the axes of the lens 35 and the lens 36, respectively. The purpose of this particular spacing will be explained in detail later; briefly, it is to increase the light collected by the rhomb 32 from the objective field and transmitted to the film.

Figure 7:
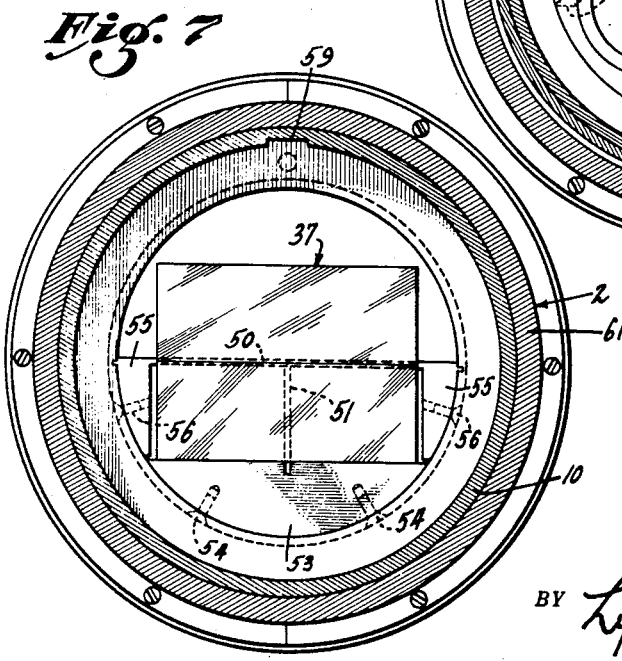
Fig. 7 is a cross section taken in the plane 7—7 of Fig. 3.

As previously mentioned, the optical elements back of the lenses 35 and 36 (Figs. 3 and 4) are fixed with respect to the tubular housing 10. Thus the optical block 39 is supported upon a horizontal partition or septum 50 extending transversely across the rear portion of member 10 and is cemented to this septum. The space below the septum 50 and back of the prism 38 is divided by a vertical septum 51 into two separate passages for the light rays going to the two frames 22a and 22b, respectively. The lower portion of the member 10 below the lower levels of the apertures 22a and 22b is filled with a segmental metal block 53 which supports the prism 38 directly and the rhomb 37 indirectly, the prism and rhomb being cemented together. The block 53 may be secured within the member 10 by screws 54 as shown in Fig. 7. Likewise the horizontal septum 50 may be mounted within the member 10 by providing arcuate end portions 55 thereon, which fit against the inner surface of the member 10 and are secured in place by screws 56.

To support the lenses 35 and 36, bi-plate 34, prism 33 and rhomb 32 in fixed relation to each other but movable as a unit, an inner sleeve 57 (Fig. 3) is smoothly, slidably fitted for free longitudinal motion in the forward end of the tubular housing 10, this inner sleeve 57 supporting all of the optical elements 32 to 36, inclusive. To maintain the sleeve 57 in a fixed position of orientation with respect to the tubular member 10, the inner sleeve is provided with a longitudinally extending key 58 (Figs. 4 and 6) which engages a longitudinal keyway 59 in the inner surface of the tubular member 10. To facilitate longitudinally adjusting the inner sleeve 57, it is provided near its forward end with an annular groove 59a (Fig. 3) which receives a ring 60 in an outer sleeve 61, which outer sleeve is provided on the inner surface with screw threads threaded onto cooperating screw threads on the exterior surface of the tubular member 10. For convenience in assembly, the ring 60 is formed in two or more sections, which are secured to the outer sleeve 61 by screws 62. It will be apparent that rotation of the outer sleeve 61 on the threaded outer surface of the tubular member 10 will shift the outer sleeve forwardly or rearwardly and this longitudinal motion will be transmitted through the ring 60 and the walls of the groove 59 to the inner sleeve 57. Suitable calibrations are provided on the outer sleeve 61 and the stationary tubular member 10, respectively, for indicating the distance for which the optical system is focused in different positions of rotation of the outer sleeve 61.

Figure 5:
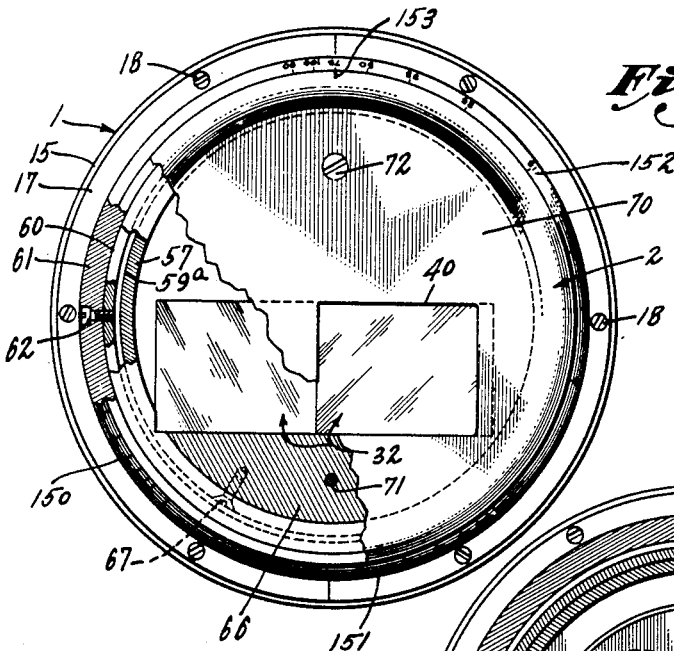
Fig. 5 is a view partly in elevation and partly in section taken in vertical planes substantially along the line 5—5 in Fig. 3.
Figure 6:
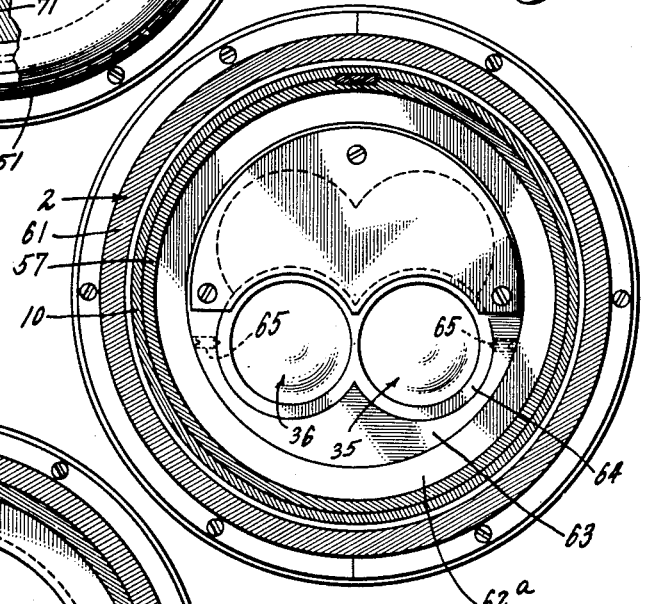
Fig. 6 is a cross section taken in the plane 6—6 of Fig. 3.

The inner sleeve 57 is provided at its rear end with an inwardly extending annular flange 62a within which there is mounted a lens sleeve 63 which has apertures drilled therein to receive the barrels 64 of the lenses 35 and 36, respectively, these barrels being secured in position by set screws 65 (Fig. 6). To support the rhomb 32, prism 33, and bi-plate 34, a segmental shelf 66 (Fig. 4) is mounted in the lower portion of the inner sleeve 57 with its upper surface substantially flush with the lower edges of the lenses 35 and 36, this shelf being secured in place by screws 67 (Fig. 5). The optical elements 32, 33 and 34 are cemented to this shelf 66.

A front face plate 70 (Fig. 4) is secured against the front end of the inner sleeve 57 by screws 71 passing therethrough into the shelf block 66 and screws 72 passing therethrough into a block 73 which is in turn secured to the sleeve 57 by screws 74. The face plate 70 has the aperture opening 40 therein previously mentioned and serves to prevent the entrance of any light through the optical system, save through this desired aperture 40.

The manner in which the amount of useful light is increased by the use of the bi-plate 34 instead of a simple optical block, will now be explained with reference to Figs. 17 to 20, inclusive. Figs. 17 and 18 being schematic diagrams of of the system including the lenses and the optical elements in front thereof, of Fig. 3, and Figs. 19 and 20 being schematic diagrams of a similar system but with a smaller rhomb and with a simple optical block in place of the bi-plate of Figs. 17 and 18.

Referring particularly to Fig. 19, there is disclosed a plate defining an aperture 80 through which light from a distant objective field is admitted, and back of the aperture 80 are a rhomb 81 and prism 82 having contacting surfaces, one of which is partially silvered to define a partial reflecting plane 83, an objective lens 84 being positioned back of the prism 82 in alignment with the aperture 80 and a second objective lens 85 being positioned to one side of the lens 84 and in alignment with the rear face 86 of rhomb 81. An optical block 87 is positioned between the rear face 86 of rhomb 81 and the objective lens 85. The lenses 84 and 85 are adapted to focus the light passing therethrough in a plane 88 to produce two identical images thereon. In this arrangement the centers of the two images defined in the plane 88, the axes of the lenses 84 and 85, and the centers of the lateral faces 83 and 89 of the rhomb 81, are all positioned equal distances apart so that rays first reflected from the partial reflection plane at 83 and then totally reflected from the face 89 on the rhomb 81, travel parallel to the corresponding rays which pass through the partial reflection plane 83. The paths of the central rays of light are indicated by the lines 90, 91, 92 and 93, respectively.

It will be observed that the effective width of the front face 94 of the rhomb 81, and therefore the permissible width of the aperture 80, is limited to substantially the distance between the centers of the faces 83 and 89 of the rhomb 81, which distance is only slightly greater than the diameter of the front element of the objective lens 84 or 85. Lines 95 and 96 drawn from the outer edges of the front element of the objective lens 84 pass the corresponding edges of the aperture 80 and define the angle of view of the optical system within which full illumination will be obtained. Any point in the objective field lying beyond the lines 95 and 96 will have a portion of the cone of the rays diverging therefrom to the front element of the objective lens 84 partially or completely cut off.

Referring now to Fig. 17, the system therein depicted is identical with that shown in Fig. 19, except that the rhomb and prism are larger and a bi-plate 97 is substituted for the simple optical block 87 in Fig. 19. The remaining elements of Fig. 17 bear the same reference numerals as corresponding elements of Fig. 19 with the prime mark added.

It is readily observable that by virtue of the increased dimensions of the rhomb 81' and the prism 82', the centers of the reflecting surfaces 83' and 89' of the rhomb are spaced a greater distance apart and the front face 94' of the rhomb and the aperture 80' are wider. Therefore the lines 95' and 96' diverge to a greater extent than do the lines 95 and 96 in Fig. 19 and the effective angle of view of the optical system is correspondingly increased. Yet the refraction of the bi-plate 97 deflects the reflected rays of light back into alignment with the objective lens 85' and redirects them parallel to the corresponding rays entering the objective lens 84.

The effective angle of view of the optical system depends, of course, not only upon the effective width of the front face 94 or 94' of the rhomb 81 or 81', as the case may be, but also on the distance the rhomb is positioned in front of the objective lens. The closer the rhomb is positioned to the lens, the wider will be the field of view, other things being equal. However, in the structure shown in Fig. 19, the minimum distance between the rhomb 81 and the objective lenses is determined by the minimum length of the optical block 87 necessary to compensate for the additional length of the path traversed by the reflected light, which additional length is represented by the length of the line 92.

In the arrangement shown in Fig. 17, the length of the line 92' is even greater than the length of the line 92 in Fig. 19, and therefore the length of the bi-plate 97 must be somewhat greater than the length of the optical block 87 to effect full compensation. In the drawings, the bi-plate 97 is shown of the same length as the optical block 87 so that in order to effect full compensation in both systems shown in Figs. 17 and 19, the bi-plate 97 should be constructed of glass having a higher index of refraction than the glass of the optical block 87 in Fig. 19. It should be noted that although (other things being equal) an increase in the spacing between the faces 83' and 89' of the rhomb 81' increases the necessary length of the bi-plate 97, thereby necessitating the positioning of the rhomb a greater distance in front of the objective lenses, the decrease in the effective angle of view produced by increasing the longitudinal spacing between the lenses and the bi-plate is less than the increase resulting from the greater lateral spacing between the faces 83' and 89', so that a net increase in the angle of view results when the distance represented by the length of the line 93' is increased.

It is customary in motion picture work to employ picture frames, the width of which is greater than the height, as clearly shown in Fig. 8. It follows that the centers of the vertically displaced frames 22a and 22c are spaced a greater distance horizontally from the centers of frames 22b and 22d, respectively, then the centers of the two lower frames 22a and 22b are displaced from the centers of the two upper frames 22c and 22d, respectively. The lenses 35 and 36 are in alignment with frames 22a and 22b, respectively, and are therefore spaced apart a distance equal to the horizontal spacing between the centers of the frames 22a and 22b. Since the distance between the centers of the partial and total reflecting surfaces 43 and 48 of the rhomb 32 is even greater than the width of the frame, rhomb 32 must be of substantial size in the arrangement of Fig. 8, if the angle of view of the camera is not to be unduly restricted. Although the arrangement described is perfectly practicable, equivalent results may be obtained with the use of a smaller rhomb in front of the lenses by rotating the entire optical system through 90°, with respect to the picture frames, as shown in Figs. 14, 15 and 16, in which corresponding elements bear the same reference numerals as in Fig. 8.

In the arrangement of Fig. 14, the lenses 35 and 36 must be positioned closer together than in the arrangement of Fig. 8, since the distance between the optical axes of the lenses must correspond to the vertical distance between the centers of frames 22a and 22c instead of the horizontal distance between the centers of frames 22a and 22b. If the lenses are of relatively large diameter as compared to the dimensions of the frames, as happens to be the case in the structure shown in Fig. 14, then it is necessary to cut away a portion of each lens in order to align their axes with the frame centers. However, this is not a serious disadvantage, and is more than compensated for by advantages resulting from the reduced size of the rhomb 32 in the vertical direction.

Thus the necessary angle of view in the vertical plane is less than the necessary angle of view in the horizontal plane in a camera in which the frame is larger horizontally than vertically. Hence with the arrangement shown in Fig. 14, the distance between the reflecting surfaces 43 and 48 of the rhomb 32 can be less than in the arrangement of Fig. 8, and the bi-plate 34 can be shorter because the path of reflected light is shorter, thereby permitting closer positioning of the rhomb 43 to the lenses, which in turn increases the effective angle of view of the system. Of course the rhomb 37 would have a greater width between its reflecting surfaces with the structure of Fig. 14 as compared with the structure of Fig. 8, but this is not a disadvantage because there is room between the lenses 35 and 36 to make the optical block 39 long enough to compensate for the increased distance travelled by the light reflected from the surfaces 46 and 47.

In view of the admitted disadvantages of mounting light dividing structures in front of the lens, it might seem that a simple solution to the problem of producing four identical images would be to employ only one lens and place the entire light dividing structure back of the lens. However, that is impractical because (1), the space required back of the lens would necessitate a special long focus lens, restricting the useful field of the camera; (2), in order to minimize spherical aberration the amount of glass back of the lens must be kept down and it is found in practice that one rhomb and optical block assembly for dividing the light once represents about the maximum amount of glass that can be introduced back of the lens without the spherical aberration reaching prohibitive magnitude. In contrast, the introduction of the described light dividing structure in front of the lenses causes no spherical aberration.

All of the systems illustrated in Figs. 8, 14, 17, and 19 completely eliminate parallax for the reason that the bundles of rays going to all the different image frames are uniformly selected from the original bundle of rays coming from the objective field over the entire cross sectional area thereof. Stated in another way, each of the image frames views the objective field from the same point of view. Furthermore although the bundles of rays which are reflected from each partial reflecting surface travel a greater distance than do the rays that pass through that same reflection plane, the distortion which would otherwise result from this difference in the length of the paths travelled by different rays, is fully compensated for by the optical block 87 in Fig. 19, the bi-plate 97 in Fig. 17 and the bi-plate 34 and optical blocks 39 in Figs. 14 and 8.

The use of the optical block or bi-plate in front of the lens is objectionable because it necessitates positioning the front rhomb and prism combination a substantial distance in front of the lens, thereby increasing the necessary size of the rhomb and prism if the amount of light delivered to the lens or lenses is not to be cut down; nevertheless, the bi-plate or optical block must be used between the front rhomb and the lens if all the images are to be maintained at the same size for objective fields at all distances from the camera. However, the inequality of image size that is prevented by the front bi-plate or optical block is that resulting from the difference in the length of the light paths from the objective field to the different lenses, which becomes a negligible percentage difference when photographing at large distances but becomes a sufficiently large percentage difference at close distances to prevent accurate registration of the different images when they are superimposed. This difference in size of the images increases as the objective field approaches the camera; hence when photographing objects only a few feet away from the camera, dimensional error would be relatively great, and it becomes absolutely necessary to employ one of the systems shown in Figs. 8, 14, 17 or 19 in order to produce satisfactory results. However, when the objective field is at a substantial distance from the camera, as when photographing objects 20 feet or more away, the lengths of the paths travelled by the rays entering the different lenses of the camera are very nearly the same and little or no noticeable edging results from eliminating the bi-plate or optical block in front of the lens system.

Therefore, for long range photography, the system shown in Figs. 8, 14, 17 and 19 may be modified by eliminating the front bi-plate 34 in Figs. 8 and 14, or 97 in Fig. 17, or the optical block 87 in Fig. 19 and bringing the front rhomb and prism combination close up to the lenses. As previously stated, bringing the rhomb and prism combination closer to the lenses permits a reduction in the size of the rhomb and prism, which is desirable.

In a camera for distant work only, in which the optical block or bi-plate in front of the lens has been eliminated, it is even feasible to place the entire image separation system in front of the lens system and employ four objective lenses, one for each frame, and aligned therewith. Such an arrangement is shown in Figs. 11, 12 and 13. In the perspective view of Fig. 11 the rhomb and prism combinations are shown spaced apart to clarify the drawings. However, they are actually positioned against each other and close to the lenses as shown in the plan and elevation views of Figs. 12 and 13.

In Fig. 11 the first rhomb-prism combination 100 corresponds in structure and function to the combination, in Fig. 8, including the rhomb 32 and prism 33, and the combination 101 in Fig. 11 corresponds in structure and function to the combination including the rhomb 37 and prism 38 in Fig. 8. The lens system in Fig. 11 includes a pair of lenses 102 and 103 aligned with the two lower frames and an upper pair of lenses 104 and 105, respectively, positioned in alignment with the two upper frames.

In all of the above systems, the front rhomb and prism combination must be specially designed to avoid the production of ghost images which would be superimposed upon the desired images on the frame. Such ghost images result from multiple reflections between the partial and total reflection surfaces of the rhomb, or from the lateral surface of the prism. The manner in which such reflections may occur to produce ghost images will now be explained with reference to Fig. 21, which is a schematic diagram of the front portion of a system similar to that shown in Fig. 17.

Figure 21:
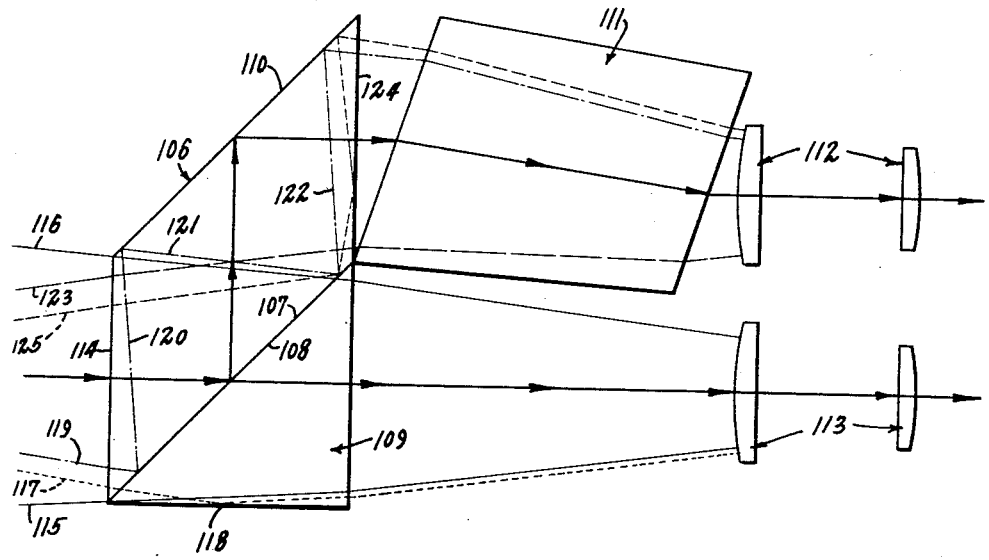
Fig. 21 is a schematic plan view of the optical system shown in Fig. 3, illustrating the operation thereof.

The system of Fig. 21 includes a front rhomb 106 having a partially silvered surface 107 (abutting the angularly extending surface 108 of a prism 109) and a total reflection surface 110. A bi-plate 111 and a pair of objective lens systems 112 and 113 are positioned back of the rhomb and prism combination. The rays passing through the lenses 112 and 113 may be focused directly on respective frames for two picture work, or they may be passed through a second image dividing system, as described with reference to Figs. 3 and 4, for four image work.

In Fig. 21 the angular limits of the useful bundle of light entering the front face 114 of the rhomb 106 are represented by the lines 115 and 116, respectively. Most of the light entering the front face 114 between the lines 115 and 116 will either pass through the partially silvered surface 107 to the lens 113 or will be reflected once from the partial reflection surface 108 and once from the total reflection surface 110, through the bi-plate 111 to the lens 112. These normal rays will be focused upon the film to produce the desired images. It is possible, however, for certain rays entering the face 114 to be reflected from other surfaces than the surfaces 107 and 110, or to be repeatedly reflected between the surfaces 107 and 110 to produce undesired images. Typical examples of these rays will now be considered:

One group of such rays entering the lower portion of face 114 along the line 117 will, after in part passing the partially silvered surface 107, strike the lateral face 118 at a low angle and be totally reflected therefrom into the lens 113 substantially parallel to the line 115. Obviously, since the rays represented by the line 117 are coming from an entirely different part of the field of view than are rays represented by the line 115, these rays 117, if permitted to reach the film, would produce a false image, or ghost.

Another group of rays from a point exterior of the desired objective field, will enter the face 114 along the line 119. That portion of these rays that is transmitted through the surface 107 will lie outside the field of view, and will not produce any effect on the picture. However, that portion of these rays reflected along the line 120 from the partial reflection plane 107, will be completely reflected from the surface 110 along the line 121 back to the surface 107, where they will again be partially reflected along the line 122, back to the surface 110 and again reflected through the bi-plate 111 and the lens system 112 to produce a ghost on the picture.

Still another group of ghost rays are represented by the line 123 passing through the face 114 of the bi-plate at such an angle as to pass directly through the rear face 124 of the bi-plate and enter the lens 112 substantially parallel to the useful rays coming from the objective field along the line 115.

The fourth group of ghost rays are represented by the line 125 and strike the partial reflection plane 107 near the upper edge thereof, are partially reflected against the rear face 124 of the rhomb at a low angle, and are reflected therefrom to the surface 110 from which they are reflected into the bi-plate 111 closely adjacent and parallel to the useful rays entering along the line 116.

These objectionable ghost rays described, are eliminated in the system shown in Fig. 3 as follows:

The rays represented by the line 117 in Fig. 21 are absorbed by extending the prism 33 upwardly (with reference to the view in Fig. 3) past the upper edge of the face 41 of the rhomb and a slot 130 is cut in the outer face 131 of the prism. The surfaces of this slot are ground and coated with light-absorbent paint so that rays intercepted by the slot are absorbed and thereby prevented from reaching the lens 35. The narrow exposed front face 132 of the prism 33 (Fig. 3) is likewise coated with opaque paint to prevent entry of light into the prism from that surface. Ghosts resulting from rays entering along the line 119 in Fig. 21 are, in Fig. 3, absorbed at the surface 48 of the rhomb 32 by grinding and painting the rear marginal portion 133 of this face. The elimination of the reflection surface at the margin 133 also eliminates the reflection to the film of ghost rays coming in along the line 125 in Fig. 21. The ghost rays coming in along the line 123 in Fig. 21 are in part eliminated by grinding and coating the lower margin 134 (with reference to Fig. 3) of the front face 41 of rhomb 32, and in part absorbed by grinding and coating the adjacent marginal areas 135 on the rear surfaces of the rhomb 32 and the prism 33. By extending the ground and coated area 134 down a short distance along the surface 48, as indicated at 136 in Fig. 3, the absorption of ghost rays entering along the line 119 in Fig. 21 is further prevented.

By grinding and blackening portions of the surfaces of the rhomb 32 and prism 33 as just described with reference to Fig. 3, the ghost rays may be completely eliminated, but at a slight sacrifice of the illumination of the desired images, since some of the useful rays are absorbed at the surfaces 132, 134, 136, 133 and 135, as well as the ghost rays.

Figure 22:
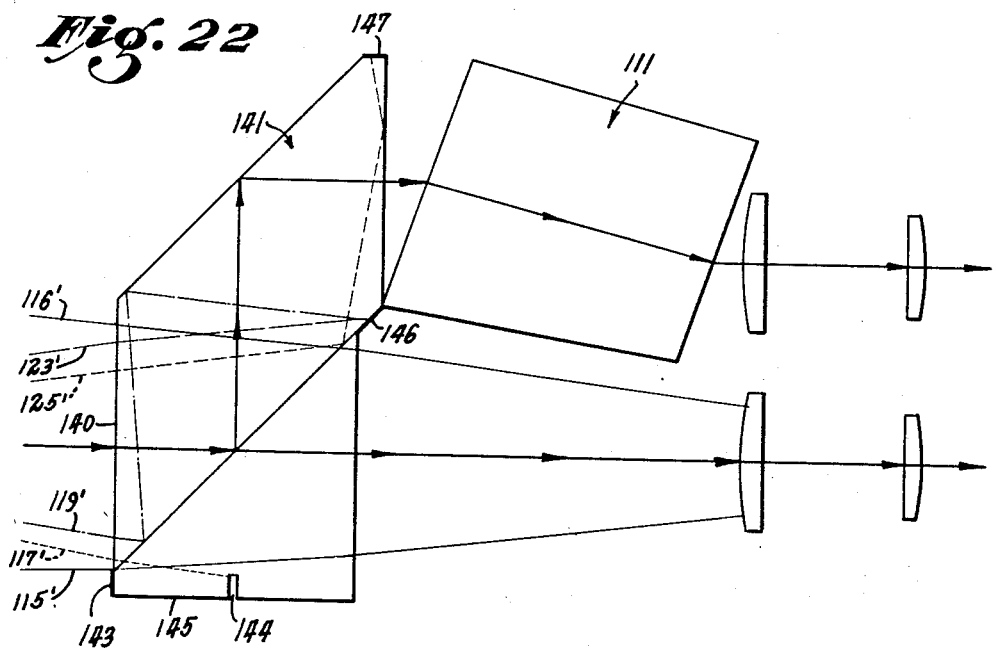
Fig. 22 is a view similar to Fig. 21 showing a modified form of the system.

An improved structure whereby a maximum receptive area for image-producing light is made available with an elimination of ghost rays, is shown in the schematic diagram of Fig. 22. In this figure although the separation of the lens units is the same, and the system otherwise similar to that of Fig. 21 in general aspects, the front light receiving face 140 of the rhomb 141 is materially larger than the corresponding face 114 in Fig. 21, and light thru substantially the entire area thereof is available for image production. In this case, the prism 145 which is somewhat larger than the prism 109 in Fig. 21, has a front truncated edge in the plane of the face 140, and rendered light absorbing as indicated at 143 by grinding and blackening or otherwise. A ground and blackened slot 144 is formed in the lower face of prism 145 to absorb the rays entering along the line 117', which would otherwise be reflected from said face into the lens. To eliminate the ghost rays entering along the lines 119', 125', and 123', the rhomb 141 is extended rearwardly in the direction of the reflecting faces, and the exposed portions 146 and 147, the latter of which is shown as truncated, of the extended faces are ground and blackened. As clearly apparent from Fig. 22, the ghost rays entering along the lines 119' and 123' are absorbed by the blackened surface 146, and the ghost rays entering along the line 125' are absorbed at the blackened surface 147. However, substantially none of the useful rays entering throughout the entire extent of the area 140 are absorbed and all of them are available to increase the intensity of illumination of the desired picture.

As has been previously indicated, it is the usual practice in ordinary still or motion picture work, to change the entire lens system when it is desired to change the angle of view, long focus lenses being employed for narrow field of view, and relatively short focus lenses being employed for wider fields of view. However, in a multiple picture system of the type herein described with reference to Figs. 3, 4, 8 and 14, in which optical elements requiring considerable longitudinal space are positioned between the lens and the film, it is impracticable or impossible to use extremely short focus lenses. Even if the space limits did not prohibit the use of lenses of a desired short focus for wide angle work, a relatively complicated mounting structure would be required to permit the use of readily interchangeable lenses. Hence I prefer to provide a single optical system within the mount 2 of Fig. 1, and adapt the camera for different angles of view by the use of the auxiliary diverging lens 3 adjustably positioned in front of the optical system described. The diverging lens 3 of Fig. 1 changes the angle of view of the camera in different amounts, according to the distance it is positioned in front of the mount 2. However, the focusing positions of the lenses 35 and 36 within the mount 2 are different for different positions of the lens 3. Therefore in order to facilitate the use of the diverging lens 3, with the optical system in mount 2, I coordinate the focusing mechanism incorporated in the mount 2 with the various positions of the lens 3.

Having described the elements of my optical system in a general way, and having explained the operation and the principle involved, I will now set forth the detailed specifications of the optical systems shown in Figs. 1 to 7, inclusive, such as to enable anyone to duplicate the system without the necessity of computing values.

The objective lenses 35 and 36 (Figs. 3 and 4) are identical and may be of any standard construction properly corrected for use alone. In the particular system shown these lenses have a focal length of 3 inches and in their rear positions as shown in Fig. 4, the rear faces of the lenses are positioned 2½ inches in front of the plane of the film 23.

The remaining necessary data is tabulated as follows:

|  | Inches |
|---|---|
| Center-to-center horizontal spacing between the lenses 35 and 36 | 1.029 |
| Center-to-center horizontal spacing between the picture frames 22A | 1.029 |
| Center-to-center vertical spacing between the picture frames 22 | 0.748 |

Material of the rhomb 32, prism 33, bi-plate 34, rhomb 37, prism 38 and optical block 39, flint glass, having an index of refraction of 1.6484.

*Dimensions of rhomb 32*

Angle A (Fig. 3), 45°.

|  | Inches |
|---|---|
| Width of front face 41 and rear face 49 | 1.250 |
| Depth between front and rear faces | 1.250 |
| Height of rhomb | 1.000 |
| Width of blackened strip 134 | 0.125 |
| Width of blackened strip 136 | 0.156 |
| Width of blackened strip 133 | 0.156 |
| Width of blackened strip 135 | 0.125 |

*Dimensions of prism 33*

Angle B, 45°.

|  | Inches |
|---|---|
| Width of rear face | 1.375 |
| Total depth | 1.250 |
| Width of face 132 | 0.125 |
| Depth of slot 130 | 0.125 |

*Dimensions of bi-plate 34*

Angle C, 74° 42'; angle D, 105° 18'.

|  | Inches |
|---|---|
| Perpendicular distance between planes of right and left lateral surfaces | 1.2755 |
| Perpendicular distance between planes of front and rear surfaces | 1.6318 |
| Height | 1 |

*Dimensions of rhomb 37*

Angle E, 45°.

|  | Inches |
|---|---|
| Height of front and rear faces | 0.748 |
| Depth between planes of front and rear faces | 0.748 |
| Width | 2.058 |

Dimensions of prism 38

Angle T, 45°.

| | Inches |
|---|---|
| Height | 0.748 |
| Depth | 0.748 |
| Width | 2.058 |

Dimensions of optical block 39

| | Inches |
|---|---|
| Height | 0.748 |
| Length between front and rear faces | 1.200 |
| Width | 2.058 |

GENERAL DATA

| | Inches |
|---|---|
| Approximate distance from plane of film 23 to the front face 45, of rhomb 37 | 2.550 |

Angle G between front face of bi-plate 34 and rear face of rhomb 32 (critical), 19° 2′ 40″.

| | Inches |
|---|---|
| Distance between front face of objective lenses 35 and 36 and rear surfaces of rhomb 32 and prism 33 | 2.040 |

The partial reflecting surfaces between rhomb 32 and prism 33 and between rhomb 37 and prism 38 are preferably of such density as to divide the light impinging thereon into reflected and transmitted components of equal intensity.

The auxiliary lens 3 must be specially corrected for use in front of the particular optical system of Figs. 3 and 4 and may comprise a front double convex component 3a of flint glass of the grade identified in the trade as "Jena" F-2 $N_D$-1.6196, $V_D$-36.3 and a rear double concave component 3b of crown glass identified in the trade as Bausch & Lomb 20-2, $N_D$ 1.5174, $V_D$ 64.6. The dimensions of these units are as follows:

| | Inches |
|---|---|
| Diameter | 3.75 |
| Axial thickness of convex component | 0.40 |
| Axial thickness of concave component | 0.20 |
| Radius of curvature of front face of convex component | 39.30 |
| Radius of curvature of rear face of convex component and front face of concave component | 9.54 |
| Radius of curvature of rear face of concave component | 5.51 |
| Focal length of combination | −15.0 |

Although numerous modifications of my invention have been described quite specifically for the purpose of clearly explaining the invention, it is to be understood that the invention is not to be limited to the exact modifications shown, as other variations will be apparent to those skilled in the art. Therefore the invention is to be limited only to the extent set forth in the appended claims.

I claim:

1. Apparatus for simultaneous multiple photography, comprising an optical element of rhomboidal section, a shorter front face of which constitutes a light entrance area from the chosen field, a generally triangular prism assembled with a first lateral face of said element with a partially reflective face therebetween, said prism having a truncated, light absorbent front edge alined with the front face of said element and terminating short of the rear face of said element, the area of said first lateral face rearward of said prism treated so as to be light absorbent, a second lateral face of said element having a totally reflective surface, and a block of trapezoidal section having a front parallel face extending at an acute angle from the inner edge of the rear face of said element to receive rays from said total reflective surface, said block as a whole sloping substantially inward towards the axis of undeflected rays and having its rear parallel face spaced substantially from its front face whereby the totally reflected bundle of rays emergent therefrom travels in parallelism with the unreflected rays, with a predetermined spacing of the central rays of reflected and unreflected light according to the separation of the respective lens systems upon which they impinge.

2. A system for simultaneous multiple photography, comprising an optical element of rhomboidal section, substantially all of one of the shorter faces of which constitutes a light receiving area at the front of the system, a generally triangular prism assembled with a first lateral face of said element, with a partially reflective surface therebetween, the rear portion of said lateral face extending rearwardly back of said prism, said extending portion treated so as to be light absorbent, a second lateral face of said element having a totally reflective surface, and means associated with the rear face of said element for bending in rays reflected from said totally reflective surface towards the path of undeflected rays passing thru said partially reflective surface, and then causing them to emerge in parallelism with such undeflected rays to adjacent lens units, said lens units mounted directly at the rear of said system said means also of a character to equalize the size of the images produced through said lens units by the deflected, and the undeflected rays respectively in the same focal plane.

3. An optical system for simultaneous multiple photography, comprising two lens units set in parallelism and in pre-determined separation, an optical element of rhomboidal section in spaced relation directly in front of said units, substantially all of a shorter front face of which constitutes a light receiving area from the chosen field for both of said units, a generally triangular prism applied to a first lateral face of said element with a partially reflective surface therebetween, a second lateral face of said element having a total reflective surface, one of said lens units being located directly behind the front face of said element and receiving image-producing light from substantially the entire area thereof, and a bi-plate block having two substantially spaced apart and diagonally extending parallel surfaces, with one of such surfaces directly behind and at an acute angle to the rear face of said element, said bi-plate block sloping inward bodily towards its rear and towards the axis or unreflected light with its rear face substantially inward from its front face and in position to deliver a maximum amount of light to the second of said lens units whereby identical images in the same focal plane may be produced by both of said lens units.

4. An optical system as set forth in claim 3, wherein said bi-plate block is formed and tilted so as to include the path of the reflected rays supplied thru the peripheral portion of the entry face of the rhomboidal element, said block serving to equalize the path of all rays therethru with the path of the unreflected rays and also constructed to maintain the exact given separation of the optical centers without any diminution of the transmitted light.

5. An optical system for simultaneous multiple photography, comprising two lens units set in parallelism and in pre-determined separation, an optical element of rhomboidal section set in spaced relation directly in front of said units and so that substantially all of a shorter front face thereof is adapted to transmit image-forming light directly to one of said lens units thru substantially the entire area of such face, a generally triangular prism assembled with a first lateral face of said element with a partially reflective surface therebetween, said prism having a truncated light-absorbent front edge alined with the front face of said element and terminating short of the rear face of said element, the remainder of said first lateral face being light-absorbent, a second lateral face of said element having a total reflective surface, and a block of trapezoidal section having a front parallel face set at an acute angle to the rear face of said element to receive rays from said total reflective surface, said block formed and tilted towards the axis of unreflected light sufficiently so as to include the path of the reflected rays supplied thru the outer edge portions of the entry face of the rhomboidal element to afford maximum light for image production and also so as to direct the light emergent therefrom upon the second of said lens units in image-forming relation whereby identical images in the same focal plane may be produced by both of said lens units.

6. Apparatus for simultaneous multiple photography, as set forth in claim 1, wherein means is provided for rendering opaque the truncated front edge of the triangular prism and also the surface of the optical element of rhomboidal section which projects rearwardly beyond the prism to eliminate false images.

7. Apparatus for simultaneous multiple photography, as set forth in claim 1, wherein the truncated front edge of the triangular prism is rendered opaque, and an opaque septum extends upwardly from the bottom of the prism a small distance and intermediate the width of the prism to eliminate false images.

8. Apparatus for simultaneous multiple photography, as set forth in claim 1, wherein the optical element of rhomboidal section is truncated at the acute angle between its rear face and second lateral face and rendered opaque at that area to eliminate false images.

9. The combination with an optical system as set forth in claim 3, means rearward of the lens units for further sub-dividing the light images emitted by at least one of the lens units into two identical parts for producing one or more further identical images.

10. The combination with an optical system as set forth in claim 3, of a mounting for holding the lens units, the rhomboidal section optical element, the prism and the bi-plate in fixed relation with a capability of bodily adjustment, means at the rear of said lens units for further sub-dividing the light images emitted therefrom to produce further light images, means comprising exposure frames for a film mounted adjacent and in fixed relation to said sub-dividing means, and means for adjusting the mounting of said lens systems in front of and with respect to said rear light sub-dividing means.

11. An optical system for simultaneous multiple photography, comprising light dividing means embodying an optical element of rhomboidal section substantially all of one of the shorter faces of which constitutes a light receiving area at the front of the system, a generally triangular prism assembled with a first lateral face of said element with a partially reflective surface therebetween, the rear portion of said element extending rearwardly back of said prism and upwardly thereover, the remainder of said first lateral face being light-absorbent, a second lateral face of said element having a total reflective surface and means associated with the rear face of said element for bending in rays reflected from said total reflective surface towards the path of undeflected rays passing thru said partially deflective surface, and then causing them to emerge in parallelism with such undeflected rays, said means also of a character to equalize the size of the images produced by the deflected and the undeflected rays, a pair of lens units mounted with fixed separation directly at the rear of said system to receive the bundles of undeflected and deflected rays respectively, said light dividing means mounted in fixed relation to said lens units with a capability of focusing movement therewith to produce identical images in the same focal plane, light sub-dividing means mounted at the rear of said lens systems and adapted to sub-divide each light image emerging from said lens into two identical images, and film exposure frames mounted in fixed relation to said light sub-dividing means.

12. An optical system set forth in claim 11, having a spring pressed dowel pin mounted and cooperative between the exposure frame mounting and the lens systems' mounting to establish and maintain correct registry therebetween.

13. Apparatus for simultaneous multiple photography as set forth in claim 1, combined with a pair of lens units mounted with predetermined separation to receive the respective bundles of light rays therefrom, and means mounted rearward of said lens units for further subdividing the light images emitted by said lens systems to produce further identical images, said means embracing a rhomboidal section element mounted in position to receive the light images from said lens units on a shorter front face thereof, with a triangular prism assembled with a first lateral face of said element and a partially reflective surface therebetween, with a second lateral face of said element totally reflective, and with an optical block in position to receive light images from the rear face of said element and transmit them to an image frame.

14. An optical system for multiple photography as set forth in claim 2, having lens units in predetermined separation to receive the bundles of deflected, and undeflected rays respectively, and means mounted at the rear of said lens units for sub-dividing the light images emerging therefrom to produce further identical light images in the same focal plane, said means embracing a rhomboidal section element of a width to receive the light images from both of said lens units, a triangular prism applied to a first lateral face of said element with a partially reflective surface therebetween, a second lateral face of said element having a totally reflective surface, and an optical block interposed between the rear face of said element and the image frames where the film is exposed.

RICHARD THOMAS.